March 10, 1936.  P. W. FASSLER  2,033,616
WELDING MACHINE
Filed Dec. 3, 1934     2 Sheets-Sheet 1
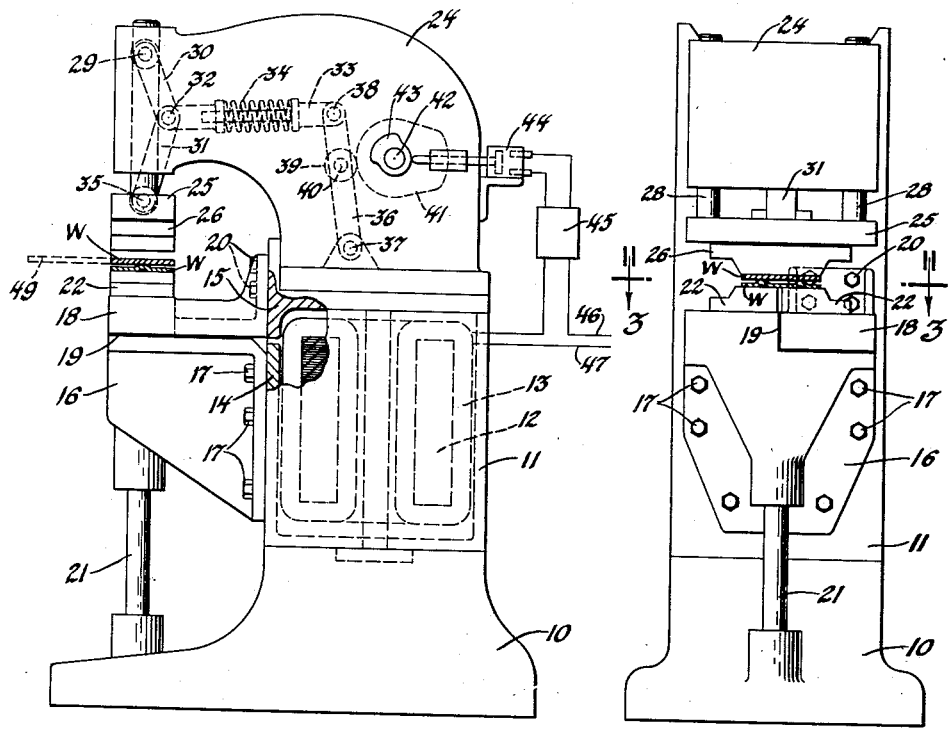
Fig. 1
Fig. 2
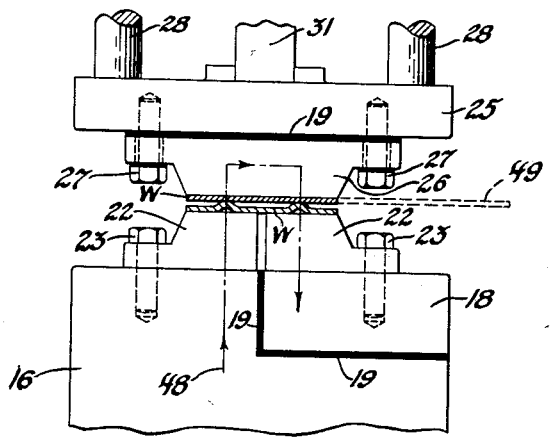
Fig. 4
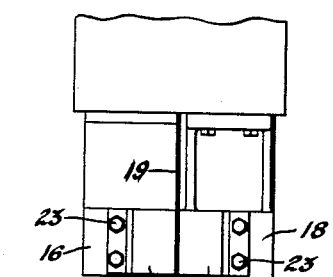
Fig. 3
INVENTOR.
Peter W. Fassler
BY
Everett G. Wright
ATTORNEY.

March 10, 1936.　　　　P. W. FASSLER　　　　2,033,616
WELDING MACHINE
Filed Dec. 3, 1934　　　2 Sheets-Sheet 2

INVENTOR.
Peter W. Fassler
BY
Everett G. Wright
ATTORNEY.

Patented Mar. 10, 1936

2,033,616

UNITED STATES PATENT OFFICE 2,033,616

WELDING MACHINE

Peter W. Fassler, Detroit, Mich.

Application December 3, 1934, Serial No. 755,683

4 Claims. (Cl. 219—4)

This invention relates to welding machines and in particular to machines for performing electric projection resistance welding.

The main object of this invention is to provide an electric projection resistance welding machine capable of welding one or more projection welds on one or more pieces of work in which the arrangement of electrodes in relation to the machine and the work being welded thereon is such that the reactance of the entire electric system therein is reduced to a minimum thereby improving the power factor thereof.

Another object of this invention is to provide an electric projection resistance welding machine in which both electrodes thereof are located on one side of the work to reduce the air space encompassed by the current carrying members to a minimum, thereby effecting a material reduction in the reactance of the entire welding circuit of the welding machine and consequently improving the power factor thereof.

Another object of this invention is to provide an electric projection resistance welding machine in which the arrangement of electrodes and work is such that a minimum of the mass of the work being welded therein will affect and add to the reactance of the entire electric system of the said machine thereby minimizing power factor losses due to the presence of the work in the machine.

Another object of this invention is to provide an electric projection resistance welding machine in which the arrangement of the electrodes in relation to the machine minimizes the reactance of the electric system thereof.

Another object of this invention is to provide an electric projection resistance welding machine in which the arrangement of electrodes in relation to the work is such that when a plurality of projection welds are accomplished simultaneously in one operation, the welding circuit is in series with the projection welds as distinguished from the usual welding circuit in parallel to a plurality of projection welds, the said series welding thereby increasing the resistance of the electric system in the welding machine and consequently improving the power factor thereof.

Other objects of this invention will become apparent by reference to the following detailed description taken in connection with the accompanying drawings, in which:

Fig. 1 is a side elevation of a welding machine embodying this invention, a portion thereof being broken away to indicate the construction of the welding transformer preferably used therewith.

Fig. 2 is a front elevation of the embodiment disclosed in Fig. 1.

Fig. 3 is a fragmentary plan view taken on line 3—3 of Fig. 2 with the work not shown.

Fig. 4 is an enlarged fragmentary front view of the welding machine shown in Fig. 1 having two pieces of work positioned therein ready for welding.

Figures 5, 6:
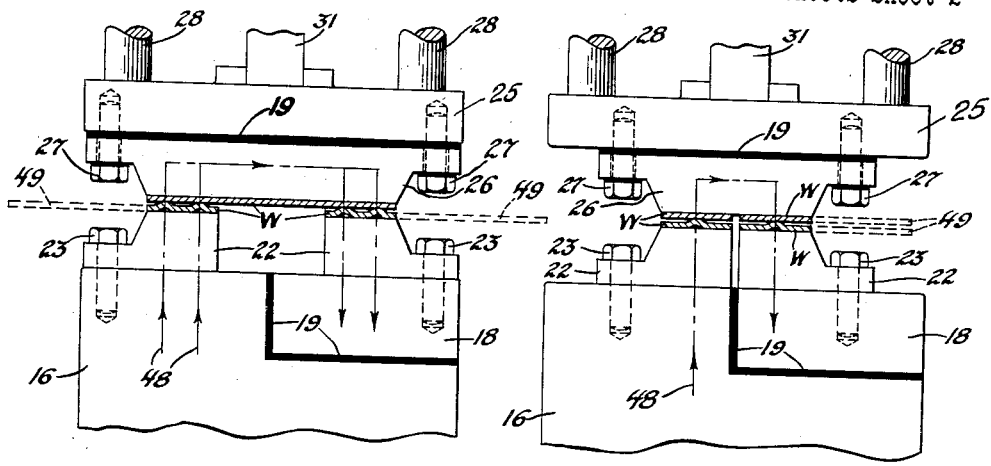
Fig. 5 is an enlarged fragmentary front view of the welding machine shown in Fig. 1 in which work for two separate simultaneous welding operations is positioned therein ready for welding.
Fig. 6 is an enlarged fragmentary front view of the welding machine shown in Fig. 1 in which one large piece of work is positioned for having two smaller pieces of work welded simultaneously thereto.

Referring particularly to the drawings wherein like numerals refer to like and corresponding parts throughout the several views, the embodiment of the welding machine shown in the drawings comprises a base 10 having a transformer in the upper part thereof; a housing 11 of the said transformer functions both as a secondary winding and as the upper part of the base of the welding machine. The transformer illustrated herein having been disclosed and claimed in my copending application for patent for welding transformers, Serial No. 747,912, is not a part of this invention, however, its use is preferable to transformers of the usual type and is highly desirable when a transformer having a multiple turn secondary winding is required or becomes advantageous.

The transformer consists in general of a combined housing and secondary winding 11, and a core 12 and primary winding 13 within the said housing. Terminal pads 14 and 15 on the combined housing and secondary winding are positioned to be conveniently connected to the electrodes of the welding machine.

A bracket shaped electrode 16 is secured to the terminal pad 14 of the transformer housing 11 by any suitable means such as the bolts 17. An upper corner of the said electrode 16 is preferably cut away as illustrated in Fig. 2 to permit another electrode 18 to be supported thereon but in insulated relation thereto. Any suitable insulation generally designated by numeral 19 in the drawings may be used. The bolts 20 secure the electrode 18 to the terminal pad 15 of the transformer housing 11. A post 21 is located under the outer end of the bracket shaped electrode 16 to directly resist the operating pressure and impact of the moving parts of the welding machine.

Suitable dies 22 are indicated in the drawings for properly positioning the work W in the welding machine and may be secured to the electrodes 16 and 18 by such suitable means as the bolts 23, however, any other desirable dies and gauges for positioning and holding the work, or any mechanism for feeding work to and carrying work away from the machine may be used without departing from this invention.

The operating head 24 of the welding machine is rigidly mounted on the upper part of its base 11 and cantilevers forward over the outer end of the bracket shaped electrode 16. A horizontally disposed pressure arm 25 carries one or more suitable contact bridges 26 insulated therefrom by suitable insulation 19 and secured thereto by the insulated bolts 27. The contact bridge 26 is preferably constructed of material of higher electric conductivity than the work W. The said pressure arm is slidably mounted in the operating head 24 by means of vertical guides 28 rigidly secured to the top of the said pressure arm 25.

The functions of the pressure arm 25 are to hold two pieces of work being welded in the machine in compressed relation to each other, to positively maintain a secondary circuit through the work and to exert sufficient pressure on the work to properly complete the projection welding operation.

The pressure arm 25 is preferably adjustably suspended from a shaft 29 in the upper part of the operating head 24 by means of the links 30 and 31 hingedly connected by a pin 32 to a horizontally disposed compression arm 33 having a spring 34 therein of sufficient stiffness to properly cushion the action of the pressure arm 25. The link 31 is connected to the pressure arm 25 by means of the pin 35. A double lever 36 is journaled at its lower end by means of the pin 37 to the bottom of the operating head 24 and is connected to the horizontally disposed compression arm 33 by means of the pin 38. A roller 39 is journaled to the shaft 40 mounted in the double lever 36 for cooperating with a cam 41 keyed to the power shaft 42. Suitable means, not shown, constantly and releasably urge the pressure arm 25 to its upward position shown in Fig. 1.

A cam 43 also keyed to the power shaft 42 closes a relay 44 during the desired period of time while the pressure arm 25 is in its lowered position, the said relay operating a switch and circuit breaker 45 by means of which current is intermittently supplied to the primary coil 13 of the transformer through conductors 46 and 47 connected to a source of alternating current.

In the case of hand operation, the work W is placed in the machine on suitable dies 22 provided therefor, and a clutch not shown, is positioned to permit any suitable driving means to turn the power shaft 42 one complete revolution during which time one welding operation is completed. In the case of power operation, the work W is intermittently and automatically fed in the machine on suitable dies 22 provided therefor, and the power shaft 42 is turned one complete revolution by any suitable driving means in synchronism with the automatic feeding of work in the machine during which time one welding operation is completed.

It is readily observed by reference to Fig. 1 and to the foregoing description that each turn of the power shaft 42 causes the cam 41 keyed thereon to actuate a system of levers and links which lowers the pressure arm 25 into working relation to the work W in the machine and creates sufficient cushioned pressure thereon to complete the welding operation. As soon as the pressure arm 25 contacts the work W, the cam 43, also keyed to the power shaft 42, closes the relay 44 which causes the welding current to flow through the machine and heat the projections in the work W and the surrounding metal to a temperature of fusion. When the weld is completed, the cam 43 releases the relay 44 which interrupts the flow of welding current through the machine, and the cam 41 turns to a position which permits the pressure arm to raise and the work to be removed from the machine.

Referring now to Fig. 4 which shows a fragmentary front view of the welding machine having two pieces of work W positioned therein ready for welding, the lower piece of the work W has had two projections formed therein through which the welding current passes as illustrated by the dot and dash line 48. The path of the welding current being from one electrode 16 through the die 22, through one projection in the lower piece of work W, through the upper piece of work W, through the contact bridge 26, through the upper piece of work W, through another projection in the lower piece of work W, through another die 22 and into the other electrode 18. It will be observed that practically no space is encompassed by the portions of the welding machine through which the welding current passes. Also a very small part of the mass of the work W is positioned so as to add to the reactance of the welding circuit which is especially true when the work is larger than shown in the drawings as illustrated by the dotted lines 49 in Fig. 1 and Fig. 4. The two projection welds are in series with the welding circuit.

In Fig. 5, a view similar to Fig. 4, four pieces of work W for two separate simultaneous welding operations are positioned in pairs in the welding machine ready for welding. The lower piece of work in each pair has had a projection formed therein through which the welding current passes as illustrated by the dot and dash line 48. It will be observed that practically no space is encompassed by the portions of the welding machine through which the welding current passes and that only a very small part of the work W is positioned to add to the reactance of the welding circuit which would be especially true when the work is larger than shown in the drawings as illustrated in Fig. 1 and Fig. 5 by the dotted lines 49. The projection welds are in series with the welding circuit.

Referring now to Fig. 6 which shows a fragmentary front view of the welding machine in which one large piece of work W is positioned for having two smaller pieces of work W welded thereto. The smaller pieces of work have had two projections formed in each of them through which the welding current passes as illustrated by the dot and dash lines 48. It will be noted that the minimum of space is encompassed by the welding machine through which the welding current passes. A very small part of the work W is positioned so as to add to the reactance of the welding circuit which is especially true when the work is larger than shown in the drawings as illustrated by the dot and dash lines 49 in Fig. 1 and Fig. 4. The two projection welds between each of the small pieces of work and the large piece of work are in parallel, however, the two groups of two projection welds between each of the small pieces of work and the large piece of work are in series with the welding circuit.

Figure 7:
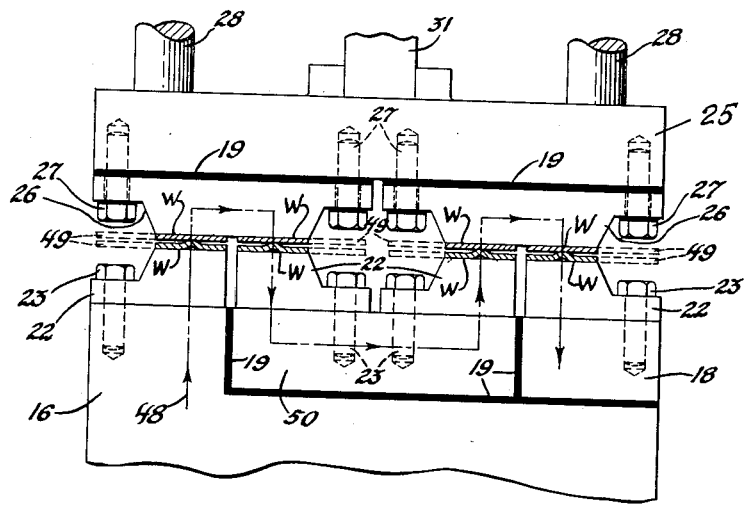
Fig. 7 is a fragmentary front view of another embodiment of the welding machine shown in Fig. 1 in which work for a plurality of separate welding operations is positioned ready for welding.

Fig. 7 is a fragmentary front view of another embodiment of the welding machine shown in Fig. 1 in which the pressure arm 25 has been widened to permit the use of two contact bridges 26, and in which the electrode 16 has been widened to permit the use of a lower stationary contact bridge 50 supported by and insulated from the said electrode 16. The electrode 18 is insulated from the stationary contact bridge 50 as well as from the electrode 16. Other parts of this embodiment are similar to the welding machine disclosed in Figs. 1–4 inclusive.

The embodiment shown in Fig. 7 permits a plurality of separate welding operations to be carried on simultaneously. For example, eight pieces of work W are positioned in four pairs ready for welding. The lower piece of work in each pair has had a projection formed therein through which the welding current passes as illustrated by the dot and dash line 48. It will be observed that practically no space has been encompassed by the portions of the welding machine through which the welding current passes and that only a very small part of the work W is positioned to add to the reactance of the welding circuit which would be especially true when the work is larger than shown in the drawings as illustrated by the dotted lines 49 of Fig. 1 and Fig. 7. The projection welds are all in series with the welding circuit.

Having thus disclosed and described the invention and one modification thereof together with illustrations of its application to projection welding, it is to be understood that many other modifications and applications thereof may be made without departing from the objects and spirit of my invention as defined by the appended claims.

I claim:

1. In an electric projection welding machine, the combination with a transformer having a secondary winding which forms the upper part of the base of said welding machine, of a bracket shaped electrode secured to said transformer secondary, another electrode also secured to said transformer secondary supported by said bracket shaped electrode but insulated therefrom, a stationary contact bridge supported by said bracket shaped electrode but insulated therefrom, a plurality of dies on said electrodes and stationary contact bridge for supporting a plurality of pieces of work having projections formed therein to be simultaneously welded in said machine to a like number of pieces of work placed on first mentioned work, and a plurality of contact bridges insulated from said welding machine adapted to apply pressure to said work and complete a welding circuit in series with said projections in said work.

2. In an electric projection welding machine, the combination with a transformer having a secondary winding which forms the upper part of the base of said welding machine, of a bracket shaped electrode secured to said transformer secondary, another electrode also secured to said transformer secondary supported by said bracket shaped electrode but insulated therefrom, dies on said electrodes for supporting work having projections formed therein, and a contact bridge insulated from said welding machine adapted to apply pressure to said work and complete a welding circuit in series with said projections in said work.

3. In an electric projection welding machine, the combination with a transformer having a secondary winding which forms a part of said welding machine, of a bracket shaped electrode secured to said transformer secondary, another electrode also secured to said transformer secondary supported by said bracket shaped electrode but insulated therefrom, said electrodes arranged for supporting work having projections formed therein, and a contact bridge insulated from said welding machine adapted to apply pressure to said work and complete a welding circuit in series with said projections in said work.

4. In an electric projection welding machine, the combination with a transformer having a secondary winding which forms a part of said welding machine, of an electrode secured to said transformer secondary, another electrode also secured to said transformer secondary juxtaposed to said first mentioned electrode but insulated therefrom, said electrodes arranged to contact work having projections formed therein, and a contact bridge insulated from said welding machine adapted to apply pressure to said work and complete a welding circuit in series with said projections in said work.

PETER W. FASSLER.